US008055187B2

(12) United States Patent
Tanabe

(10) Patent No.: US 8,055,187 B2
(45) Date of Patent: Nov. 8, 2011

(54) COMMUNICATION TERMINAL AND COMMUNICATION METHOD FOR EXCHANGING CONTENTS

(75) Inventor: Hideki Tanabe, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 737 days.

(21) Appl. No.: 12/141,605

(22) Filed: Jun. 18, 2008

(65) Prior Publication Data

US 2008/0318525 A1    Dec. 25, 2008

(30) Foreign Application Priority Data

Jun. 19, 2007   (JP) .................................. 2007-161605

(51) Int. Cl.
*H04H 20/71* (2008.01)
(52) U.S. Cl. ...................... 455/3.05; 455/3.01; 455/3.06; 455/41.2; 455/500; 455/502; 455/503; 455/414.2; 455/414.3; 705/14.64; 705/14.65; 705/14.66
(58) Field of Classification Search ................. 455/41.2, 455/3.01–3.06, 500, 502, 503, 414.1–414.3; 705/14.64, 14.65, 14.66
See application file for complete search history.

(56) References Cited

U.S. PATENT DOCUMENTS

| | | | | |
|---|---|---|---|---|
| 5,819,160 A * | 10/1998 | Foladare et al. | ................. | 455/45 |
| 6,678,215 B1 * | 1/2004 | Treyz et al. | ..................... | 368/10 |
| 7,200,357 B2 * | 4/2007 | Janik et al. | .................... | 455/3.02 |
| 7,620,363 B2 * | 11/2009 | Spurgat et al. | ................ | 455/3.05 |
| 2002/0087996 A1 * | 7/2002 | Bi et al. | ........................... | 725/89 |
| 2005/0226166 A1 | 10/2005 | Agrawal et al. | | |

FOREIGN PATENT DOCUMENTS

| | | |
|---|---|---|
| JP | 2002-94687 | 3/2002 |
| JP | 2002-223466 | 8/2002 |
| JP | 2004-54023 | 2/2004 |
| WO | 2004/066178 | 8/2004 |
| WO | 2005022861 A1 | 3/2005 |
| WO | 20060133737 A1 | 12/2006 |
| WO | WO 2006/133737 * | 12/2006 |

OTHER PUBLICATIONS

Extended European Search Report for Application No. 08010210.6, Dated Feb. 8, 2010, 7 pages.
Patent Abstracts of Japan for Japanese Publication No. 2004-054023, Publication date Feb. 19, 2004 (1 page).
Patent Abstracts of Japan for Japanese Publication No. 2002-094687, Publication date Mar. 29, 2002 (1 page).
Patent Abstracts of Japan for Japanese Publication No. 2002-223466, Publication date Aug. 9, 2002 (1 page).

* cited by examiner

*Primary Examiner* — Tuan A Tran
(74) *Attorney, Agent, or Firm* — Osha Liang LLP

(57) ABSTRACT

Opportunity of enjoying video and music is enlarged. A content reproducing device is used in a contents exchange system including a plurality of contents reproducing devices. The content reproducing device includes a short range communication unit, a memory, a control unit, and a speaker. The short range communication unit communicates request information, response information, content data and flag information to/from content reproducing devices. The control unit controls the short range communication unit so that content data is transmitted. The control unit controls the memory such that the content data and the flag information received by the short range communication unit are stored.

15 Claims, 10 Drawing Sheets

FIG.3

| TITLE | REPRODUCTION NUMBER | TRANSFER PERMISSION | ERASURE AFTER TRANSMISSION | TRANSFER NUMBER | CHANGE PERMISSION | TRANSMISSION SOURCE | KEYWORD | CONTENT DATA |
|---|---|---|---|---|---|---|---|---|
| CONTENT A | 3 | 0 | 1 | 0 | 0 | ×××○○○ | MR. A | contentsa.wav |
| CONTENT B | 2 | 1 | 0 | 8 | 1 | △△△×○× | SUMMER RHAPSODY | contentsb.wav |
| CONTENT C | 0 | 1 | 0 | 10 | 1 | ○×○××○ | OF COURSE | contentsc.wav |

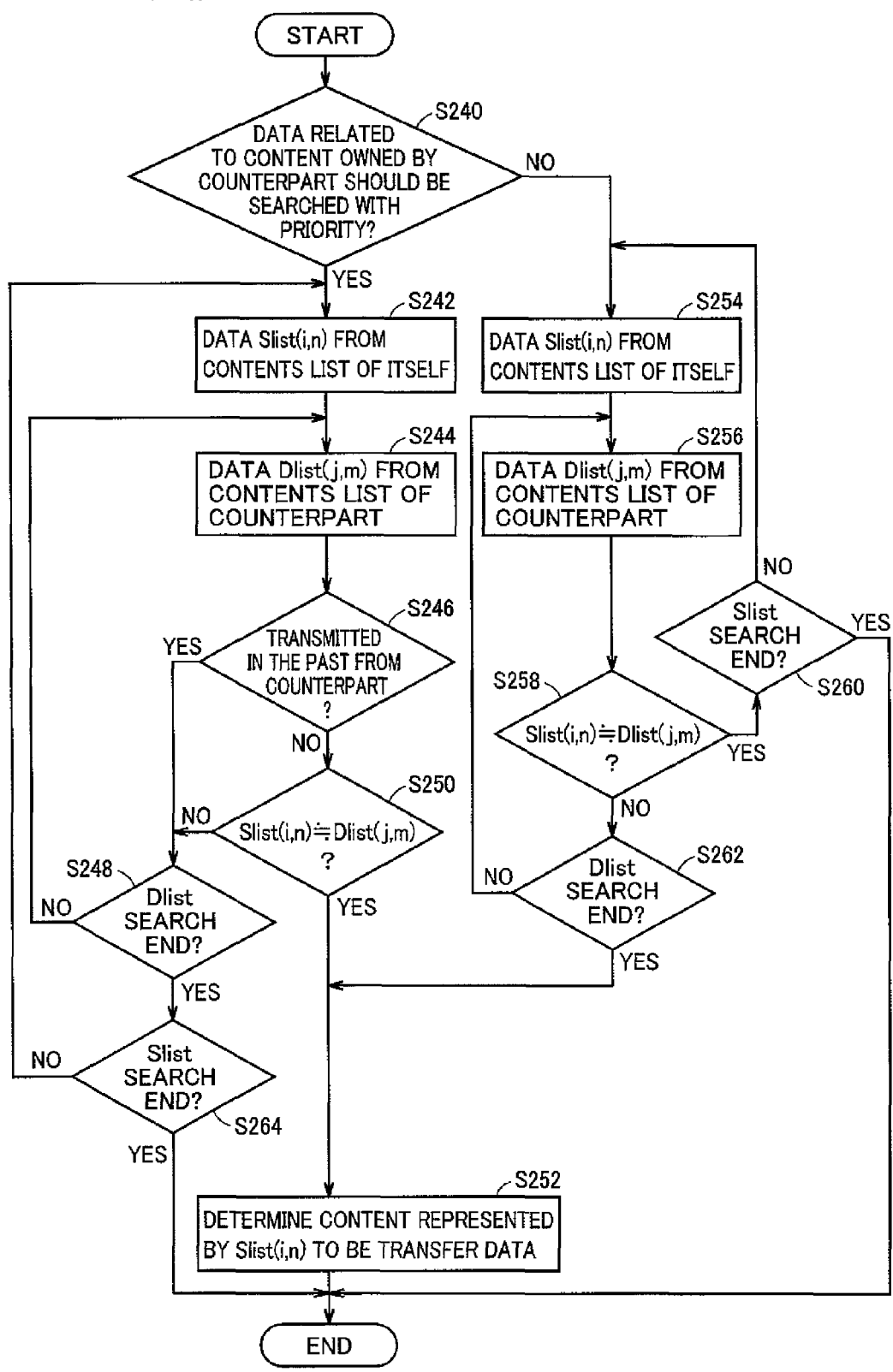

FIG.10

| TITLE | NUMBER OF REPRODUCTIONS | TRANSFER PERMISSION | ERASURE AFTER TRANSMISSION |
|---|---|---|---|
| CONTENT A | 3 | 0 | 1 |
| CONTENT B | 2 | 1 | 0 |
| CONTENT C | 1 | 1 | 0 |

FIG.11

| TITLE | NUMBER OF REPRODUCTIONS | TRANSFER PERMISSION | ERASURE AFTER TRANSMISSION |
|---|---|---|---|
| CONTENT C | 3 | 1 | 1 |
| CONTENT D | 2 | 0 | 0 |
| CONTENT E | 1 | 1 | 1 |

FIG.12

| TITLE | NUMBER OF REPRODUCTIONS | TRANSFER PERMISSION | ERASURE AFTER TRANSMISSION |
|---|---|---|---|
| CONTENT A | 3 | 0 | 1 |
| CONTENT B | 2 | 1 | 0 |
| CONTENT C | 1 | 1 | 0 |
| CONTENT E | 0 | 1 | 1 |

FIG.13

| TITLE | NUMBER OF REPRODUCTIONS | TRANSFER PERMISSION | ERASURE AFTER TRANSMISSION |
|---|---|---|---|
| CONTENT B | 0 | 1 | 0 |
| CONTENT C | 3 | 0 | 0 |
| CONTENT D | 2 | 0 | 0 |

COMMUNICATION TERMINAL AND COMMUNICATION METHOD FOR EXCHANGING CONTENTS

BACKGROUND OF THE INVENTION

1. Field of the Invention

The present invention relates to a communication terminal and, more specifically, to a communication terminal suitable for obtaining content data.

2. Description of the Background Art

Japanese Patent Laying-Open No. 2002-094687 discloses a portable information terminal including an acquisition information storage unit, a response information storage unit, a radio communication unit, a first transmission control unit, and a reception control unit. The acquisition information storage unit stores information of which acquisition is desired. The response information storage unit stores the acquired information. The radio communication unit transmits/receives information to/from other apparatus. The first transmission control unit is connected to the acquisition information storage unit and to the radio communication unit, and transmits the information stored in the acquisition information storage unit to other apparatus. The reception control unit is connected to the response information storage unit and to the radio communication unit, receives information from other apparatus and stores it in the response storage unit.

The portable information terminal allows exchange of information while no other person is aware of it.

Japanese Patent Laying-Open No. 2004-054023 discloses an information processing device including a reproduction unit, a reproduction state detecting unit, a selection unit, a generation unit, and a transmitting unit. The reproduction unit reproduces a tune. The reproduction state detecting unit detects the state of reproduction of the tune by the reproduction unit. The selection unit selects, in accordance with the state of reproduction, the tune reproduced by the reproduction unit as a recommended tune. The generation unit generates tune information of the recommended tune selected by the selection unit. The transmitting unit transmits the tune information to other information processing devices.

The information processing device allows selection of preferable tune efficiently without sticking to a specific genre, and a preferred tune can be selected without using a server.

International Publication No. 2004/066178 discloses a method of distributing contents to wireless terminals. The contents distributing method includes the following four steps executed by a wireless terminal: the first step of detecting a wireless terminal capable of communication; the second step of receiving a content; the third step of receiving control information related to the content; and the fourth step of performing control in accordance with the control information.

This method enables communication reflecting the intention of contents provider.

Japanese Patent Laying-Open No. 2002-223466 discloses an information exchange system including a terminal and an information providing station. The terminal includes a short range radio communication device. The information providing station also includes a short range radio communication device. The short range radio communication device of the information providing station includes an information content holding unit and a first broadcasting unit. The information content holding unit stores information content registered in advance. The first broadcasting unit broadcasts the information content stored in the information content holding unit at a prescribed time interval. The short range radio communication device of the terminal includes a first reception unit and a storage unit. The first reception unit receives the information content broadcast from the first broadcasting unit of the information providing station. The storage unit stores the received information content.

According to this system, efficient exchange of information is possible between information providing side and provided side, not necessitating any specific operation by the user or repeated transmission/reception.

The inventions disclosed in Japanese Patent Laying-Open Nos. 2002-094687 and 2004-054023, however, are disadvantageous in that chances of enjoying video or music could possibly be limited. According to these inventions, the video or music as the object information to be provided is limited to those evaluated in some aspect by the user of the terminal that provides the information. Therefore, even for a video or music that could be prized by many users, there would be no chance for any user to enjoy the video or music unless the user who first enjoyed the video or music evaluates it.

The invention disclosed in International Publication No. 2004-066178 is also disadvantageous in that chances of enjoying video or music could possibly be limited. Though it is possible to know users' evaluation of a video or music, measures that could be taken to promote usage are limited.

The invention disclosed in Japanese Patent Laying-Open No. 2002-223466 is disadvantageous as it has no consideration on limited chance of enjoying video and music.

SUMMARY OF THE INVENTION

The present invention was made to solve the above-described problems and its object is to provide a communication terminal that can increase the chance of enjoying video and music.

Another object is to provide a communication method that can increase the chance of enjoying video and music.

According to an aspect, the present invention provides a communication terminal forming a contents exchange system. The communication terminal includes a communication device, an operation unit receiving an input of an instruction to the communication terminal, a memory, a controller controlling an operation of the communication terminal, and an output device outputting the content. The communication device communicates, to/from another communication terminal, request information requiring a response, response information representing the response, content data representing content as at least one of image and voice, and determination information defining whether the content data is to be an object of transmission. The memory stores the content data and the determination information. The controller causes another communication terminal included in the contents exchange system to repeatedly transmit the request information to the communication device, when the response information transmitted from said another communication terminal in response to the request information is received by the communication device, causes the communication terminal that transmitted the response information to transmit the determination information to the communication device, when the request information is received from said another communication terminal, causes the communication device to transmit the response information and the determination information to said another communication terminal, when the communication device transmits the determination information and determination information different from that transmitted by the communication device is received by the communication device, determines whether the content data is to be transmitted or not, based on the determination information transmitted by the communication device and the determination information received by the communication device, causes the communication device to transmit the content data determined to be transmitted, and when content data different from the transmitted content data is received by the communication device, stores in the memory the received content data and the determination information on the received content data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows a relation between flag information and contents data stored in a memory in accordance with the embodiment of the present invention.

FIG. 9 is a flowchart representing content selecting process in accordance with the embodiment of the present invention.

FIG. 10 represents flag information stored in one of the content reproducing devices before transmission of content data, in accordance with the embodiment of the present invention.

FIG. 11 represents flag information stored in the other one of the content reproducing devices before communication of content data, in accordance with the embodiment of the present invention.

FIG. 12 represents flag information stored in the one of the content reproducing devices after communication of content data, in accordance with the embodiment of the present invention.

FIG. 13 represents flag information stored in the other one of the content reproducing devices after communication of content data, in accordance with the embodiment of the present invention.

DESCRIPTION OF THE PREFERRED EMBODIMENTS

Figure 1:
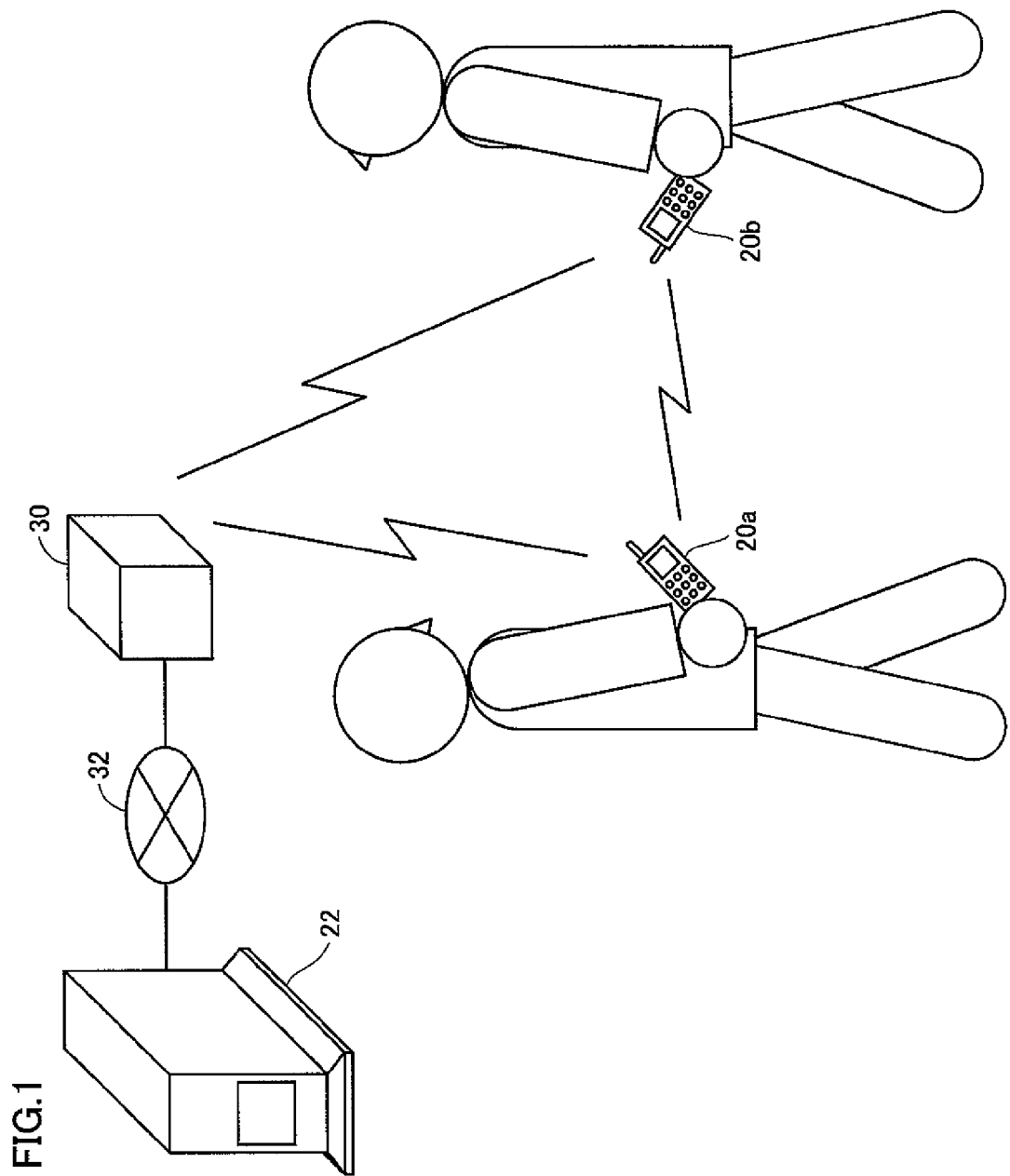
FIG. 1 shows a concept of contents exchange system in accordance with an embodiment of the present invention.

In the following, an embodiment of the present invention will be described with reference to the figures. In the following description, the same components are denoted by the same reference characters. Their names and functions are also the same. Therefore, detailed description thereof will not be repeated.

FIG. 1 schematically shows an operation and configuration of contents exchange system in accordance with the embodiment of the present invention. Referring to FIG. 1, the contents exchange system in accordance with the present embodiment includes content reproducing devices 20a and 20b (hereinafter, these will be generally referred to as content reproducing device 20). In the present embodiment, the content reproducing device is implemented as a portable telephone. Content reproducing device 20 may be implemented by any apparatus, as long as it is a communication terminal (that is, a device capable of communication with a computer such as a server 22). By way of example, content reproducing device 20 may be implemented by an audio player, or it may be implemented by a portable DVD (Digital Versatile Disc) player.

In the present embodiment, receiving a user instruction, content reproducing device 20 receives content data from a server 22 through a base station 30 and a network 32. Receiving the content data, content reproducing device 20 stores the content data. In the present embodiment, the "content data" refers to data representing at least one of image and voice. In the present embodiment, the image or voice itself will be referred to as "content."

Content reproducing device 20 held by a user transmits radio wave at regular intervals. The radio wave represents request information. In the present embodiment, the "request information" means information that requests a response. Content reproducing device 20 receives the radio wave transmitted by other content reproducing device, in the interval of transmission of request information. The radio wave represents response information. In the present embodiment, the "response information" means a response to the request information and the identification information of the content reproducing device that returned the response. When the radio wave is detected, content reproducing device 20 determines whether the radio wave exceeds a threshold value or not. If it is above the threshold value, content reproducing device 20 determines if exchange of content data is possible or not. If exchange of content data is determined to be possible, content reproducing device 20 executes a process for exchanging the content data with the content reproducing device 20 that has transmitted the response information. The determination as to whether content exchange is possible or not, and the process for exchanging content will be described later.

Figure 2:
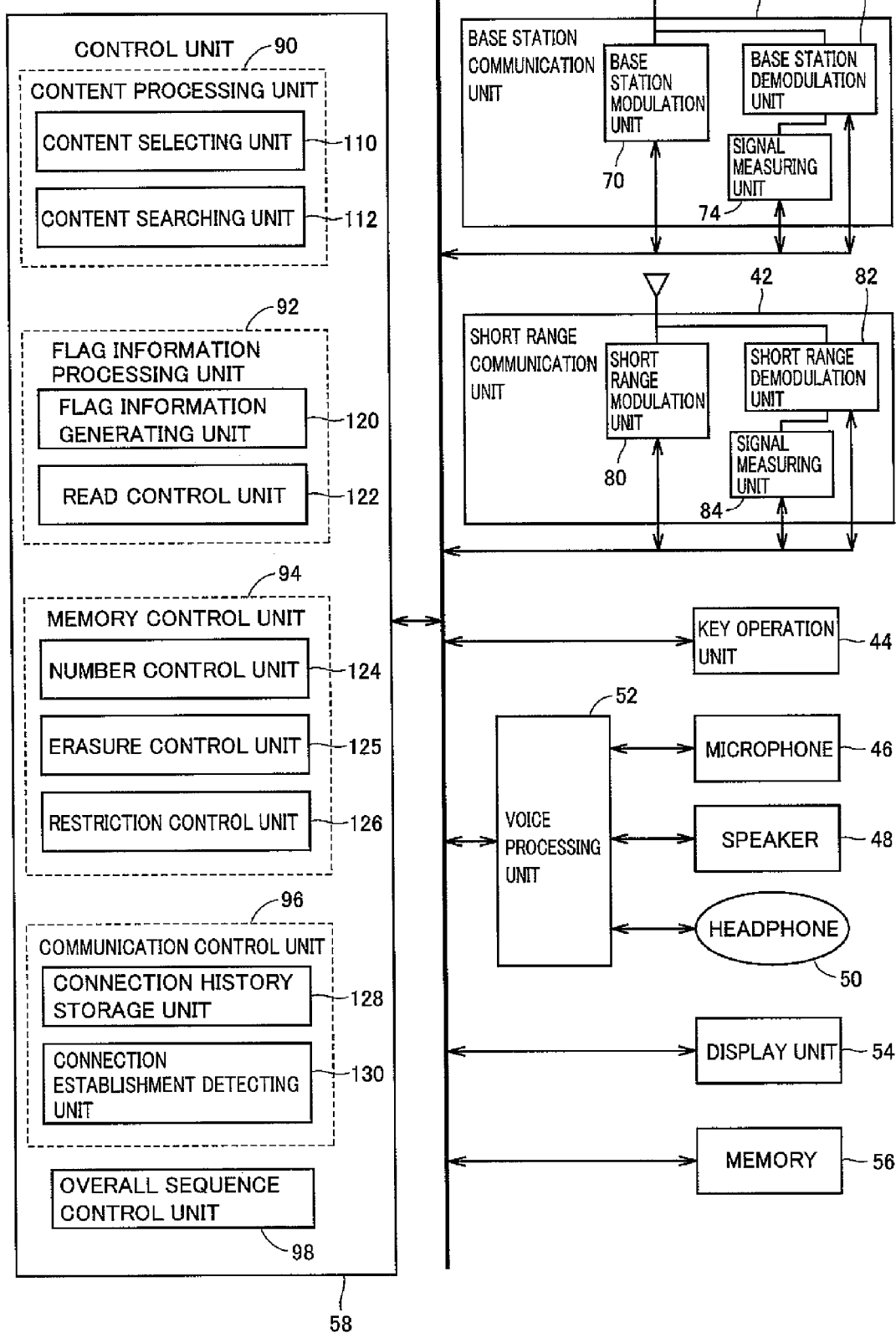
FIG. 2 shows a configuration of the content reproducing device and a CPU's functions in accordance with the embodiment of the present invention.

FIG. 2 shows a configuration of content reproducing device 20 and functions of a control unit 58 provided in content reproducing device 20, in accordance with the present embodiment. Referring to FIG. 2, content reproducing device 20 in accordance with the present embodiment includes a base station communication unit 40, a short range communication unit 42, a key operation unit 44, a microphone 46, a speaker 48, a headphone 50, a voice processing unit 52, a display unit 54, a memory 56, and a control unit 58.

Base station communication unit 40 communicates with base station 30. Short range communication unit 42 communicates with an external communication device (in the present embodiment, with other content reproducing device 20). A protocol for short range communication unit 42 to communicate with external communication device is different from the protocol for base station communication unit 40 to communicate with base station 30. Key operation unit 44 receives a user instruction or information input, and generates a signal in accordance with the user operation. Microphone 46 receives voice of the user, and converts the voice to an electric signal. Speaker 48 converts an electric signal representing voice, and outputs the voice. Headphone 50 converts voice of the user to an electric signal and converts the electric signal representing voice to the voice, separate from microphone 46 and speaker 48.

Voice processing unit 52 converts electric signals output from microphone 46 or headphone 50 to signals usable by control unit 58 and the like. Further, voice processing unit 52 converts signals output from control unit 58 and the like to signals usable by speaker 48 or headphone 50. Display unit 54 displays, when an electric signal is input, information corresponding to the electric signal. Therefore, display unit 54 operates as a device that displays information represented by the electric signal. Memory 56 stores information. The information stored therein will be described later. Control unit 58 is implemented by a processor such as a CPU (Central Processing Unit) or a microprocessor. Control unit 58 controls various units of content reproducing device 20. Further, control unit 58 performs various operations and searches for content or other data.

Base station communication unit 40 includes a base station modulation unit 70, a base station demodulation unit 72, and a signal measuring unit 74.

Base station modulation unit 70 modulates a signal output from control unit 58 or the like to a signal for transmission. Base station demodulation unit 72 demodulates an electric signal received by an antenna to a signal usable by control unit 58 or the like. Signal measuring unit 74 measures intensity of the signal demodulated by base station demodulation unit 72.

Short range communication unit 42 includes a short range modulation unit 80, a short range demodulation unit 82, and a signal measuring unit 84. Short range modulation unit 80 modulates a signal output from control unit 58 or the like to a signal for transmission through the antenna. Short range demodulation unit 82 demodulates a signal received by the antenna to a signal usable by control unit 58 or the like. Signal measuring unit 84 measures intensity of the signal demodulated by short range demodulation unit 82.

Control unit 58 includes a content processing unit 90, a flag information processing unit 92, a memory control unit 94, a communication control unit 96, and an overall sequence control unit 98.

Content processing unit 90 selects or searches for content data stored in memory 56. Flag information processing unit 92 controls flag information stored in memory 56 or generates flag information. The flag information is used for determining, for example, whether the content data is to be the object of transmission or not, and represents each element as a basis for the determination by a flag value or data. Memory control unit 94 controls the number of transfers of content data and the like.

Communication control unit 96 controls communication by base station communication unit 40 or short range communication unit 42. Overall sequence control unit 98 controls operations necessary for content reproducing device 20 to perform its functions.

The process governed by overall sequence control unit 98 includes the following two processes. The first process is control of memory 56 such that the content data received from server 22 is stored therein. The second process is control of memory 56 such that flag information of the content data received from server 22 is stored therein. Here, if the flag information received from server 22 does not involve flag value information permitting transmission, memory 56 is controlled such that the flag value information not permitting transmission is stored as part of the flag information.

Content processing unit 90 includes a content selecting unit 110 and a content searching unit 112.

Content selecting unit 110 repeatedly determines whether each of a plurality of content data is to be transmitted or not based on the flag information transmitted by short range communication unit 42 and flag information received by short range communication unit 42, and thereby selects a content. Here, the flag information is different from the flag information transmitted by the short range communication unit 42. The selection is done when short range communication unit 42 transmits a piece of flag information and the short range communication unit 42 receives a piece of flag information. The determination as to whether the data should be transmitted or not may be made on various factors. In the present embodiment, the content data is transmitted if a predetermined one of the following four conditions is met. The first is that the flag information permits transmission, and a title received by short range communication unit 42 (the information representing the title is received as a part of the flag information) is different from the existing title. The second is that the flag information indicates that the number of transmissions satisfies a requirement, and the title is different from the title received by short range communication unit 42. The third is that the number of reproductions (number of outputs from speaker 48 or display unit 54) has exceeded a threshold value and the title is different from the title received by short range communication unit 42. The fourth is that the transmission source of flag information received by short range communication unit 42 is not the same as the transmission source of the content data.

Content searching unit 112 searches for content data stored in memory 56.

Flag information processing unit 92 includes a flag information generating unit 120, and a read control unit 122. Flag information generating unit 120 generates flag information. Read control unit 122 reads flag information from memory 56 or stores flag information in memory 56.

Memory control unit 94 includes a number control unit 124, an erasure control tilt 125, and a restriction control unit 126.

Number control unit 124 manages the number of content data transfers, based on information stored in memory 56. As a way of management, number control unit 124 performs the following three updates. The first update is an update of flag information based on reception of an instruction through key operation unit 44. For instance, a flag indicating whether transfer is permitted or not, or a flag value indicating whether erasure after transfer is to be done or not is changed in response to an instruction through key operation unit 44, for those pieces of flag information that allows change. The second update is an update of flag value indicating the number of transmissions of the content data. This update is done on the flag included in flag information when the flag information is transmitted together with the content data. The third update is an update for adding information indicating transmission source. This update is done to provide identification information corresponding to the content reproducing device 20 that transmitted the response information.

Erasure control unit 125 erases, after a content data is transmitted by short range communication unit 42, the content data that has been stored in memory 56 and transmitted by short range communication unit 42. In the present embodiment, when the flag information indicates that erasure of the content data transmitted by short range communication unit 42 is necessary, erasure control unit 125 erases the content data stored in memory 56.

Restriction control unit 126 controls content transfer, based on information stored in memory 56. As a way of control, if content data different from the content data transmitted by short range communication unit 42 is received by short range communication unit 42, restriction control unit 126 controls memory 56 such that the content data received by short range communication unit 42 and flag information related to the content data are stored therein.

Communication control unit 96 includes a connection history storage unit 128 and a connection establishment detecting unit 130.

Connection history storage unit 128 stores information indicating an apparatus to which content reproducing device 20 was connected in the past. Connection establishment detecting unit 130 detects establishment of connection.

Connection establishment detecting unit 130 controls short range communication unit 42 such that the content data determined to be transmitted by content selecting unit 110 is transmitted. Connection establishment detecting unit 130 controls short range communication unit 42 such that flag information is transmitted to that content reproducing device 20 which has transmitted the response information. Transmission of flag information is executed when the request information is repeatedly transmitted to any of the content reproducing devices 20 and the response information transmitted by any of the content reproducing devices 20 in response to the transmission of request information is received by short range communication unit 42. It is noted, however, that the transmission destination is either the content reproducing device 20 of which number of past transmissions is the largest, or the content reproducing device 20 of which radio wave used for communication has the highest intensity. Here, the number of past transmissions of each content reproducing device is stored in memory 56.

If there are a plurality of content reproducing devices 20 of which radio wave used for communication has the highest intensity, the content reproducing device 20 of which number of past transmissions is the largest among these will be the transmission destination. If there are a plurality of content reproducing devices 20 of which number of past transmissions is the largest, the content reproducing device 20 of which radio wave used for communication has the highest intensity among these will be the transmission destination. If there is a content reproducing device 20 with which communication is permitted and its identification information is stored in memory 56, the device may be the transmission destination.

Further, connection establishment detecting unit 130 controls short range communication unit 42 such that upon reception of the request information from a content reproducing device 20, response information and flag information are transmitted to the content reproducing device 20.

FIG. 3 schematically shows how the flag information and contents data are stored in the present embodiment. Referring to FIG. 3, in the present embodiment, pieces of flag information and contents data are stored in correspondence with each other. The order of flag information corresponds to the order of reception. In the present embodiment, the flag information and the content data are stored as mutually different files. A file including both the flag information and the content data may be stored.

The flag information includes: data representing a title of content itself (in FIG. 3, the box of "title"); data representing the number of reproductions (in FIG. 3, the box of "reproduction number"); a flag value indicating permission of transfer (in FIG. 3, the box of "transfer permission"); a flag value indicating whether the content data is to be erased after transfer (in FIG. 3, the box of "erasure after transfer"); the number of permitted transfers (in FIG. 3, the box of "transfer number"); a flag value indicating whether conditions for transfer can be changed by the user or not (in FIG. 3, the box of "change permission"); identification information of content reproducing device 20 that has transmitted the content data (the identification information is a predetermined piece of information different for different content reproducing device 20, in order to distinguish devices 20 from each other: in FIG. 3, the box of "transmission source"); and information representing a keyword for the content. Though the keyword is not specifically limited, a player's name, a composer's name, a lyric writer's name, a related film's title and a performer's name are possible examples. In FIG. 3, this corresponds to the box "keyword".

Figure 4:
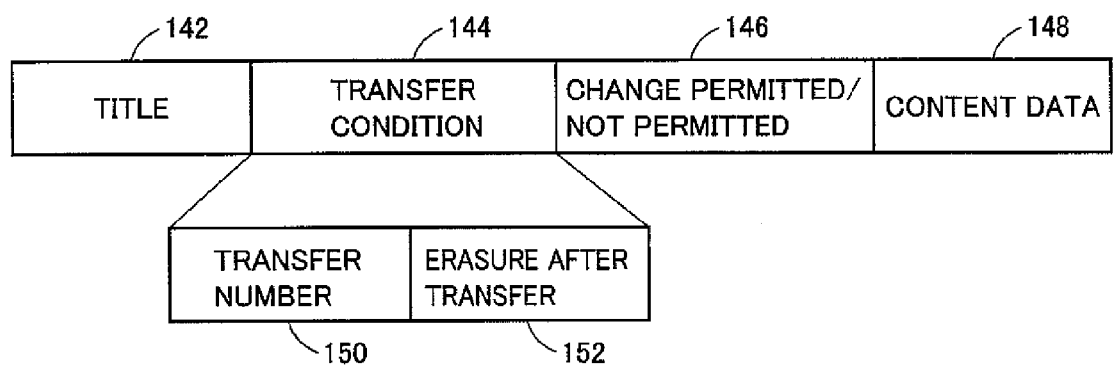
FIG. 4 shows a format of information transmitted to the content reproducing device in accordance with the embodiment of the present invention.

Among these pieces of information, those which must be generated are generated by flag information generating unit 120 based on information received from server 22. FIG. 4 shows a format of information transmitted by server 22 through base station 30 and network 32. Referring to FIG. 4, the format includes an area representing a title, an area representing transfer conditions, an area representing whether transfer is permitted or not, and an area representing content data.

The area representing transfer conditions includes an area representing the number of permitted transfers, and an area representing whether the data is to be erased after transfer.

The format of information transmitted by server 22 includes a header area, not shown, in addition to the areas shown in FIG. 4. The header area represents prescribed information necessary for communication of these pieces of information.

Figure 5:
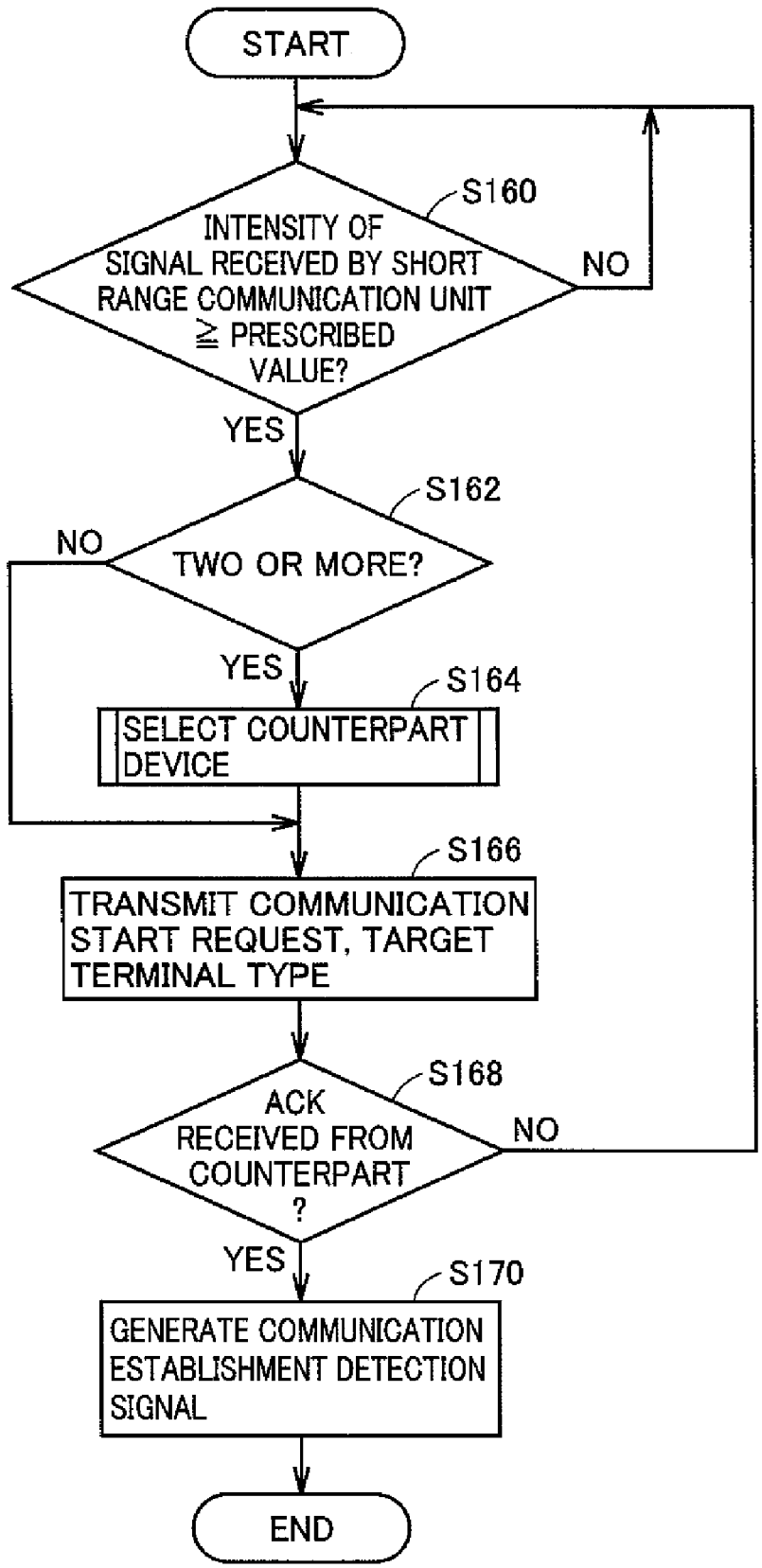
FIG. 5 is a flowchart representing a process for requesting start of communication, in accordance with the embodiment of the present invention.

Referring to FIG. 5, the program executed by content reproducing device 20 executes the following control, in establishing communication with another content reproducing device 20.

At step S160, signal measuring unit 84 measures the intensity of electric signal demodulated by short range demodulation unit 82, and outputs a value indicating the intensity to control unit 58. Connection establishment detecting unit 130 in control unit 58 determines whether the intensity of electric signal output from short range demodulation unit 82 is equal to or higher than the threshold value. If the signal intensity is determined to be equal to or higher than the threshold value (YES at step S160), the process proceeds to step S162. If not (NO at step S160), the process returns to step S160.

At step S162, connection establishment detecting unit 130 analyses a signal or signals of which signal intensity measured by signal measuring unit 84 is not lower than the threshold value among the signals output from short range demodulation unit 82, and determines whether the signals have been transmitted from two or more content reproducing devices 20. If the response information represented by the signals includes two or more different types of identification information (here, pieces of information predetermined device by device 20, used for distinguishing content reproducing devices 20 from each other), connection establishment detecting unit 130 determines that the signals have been transmitted from two or more content reproducing devices 20. If it is determined that the signals have been transmitted from two or more content reproducing devices 20 (YES at step S162), the process proceeds to step S164. If not, (NO at step S162), the process proceeds to S166.

Figure 7:
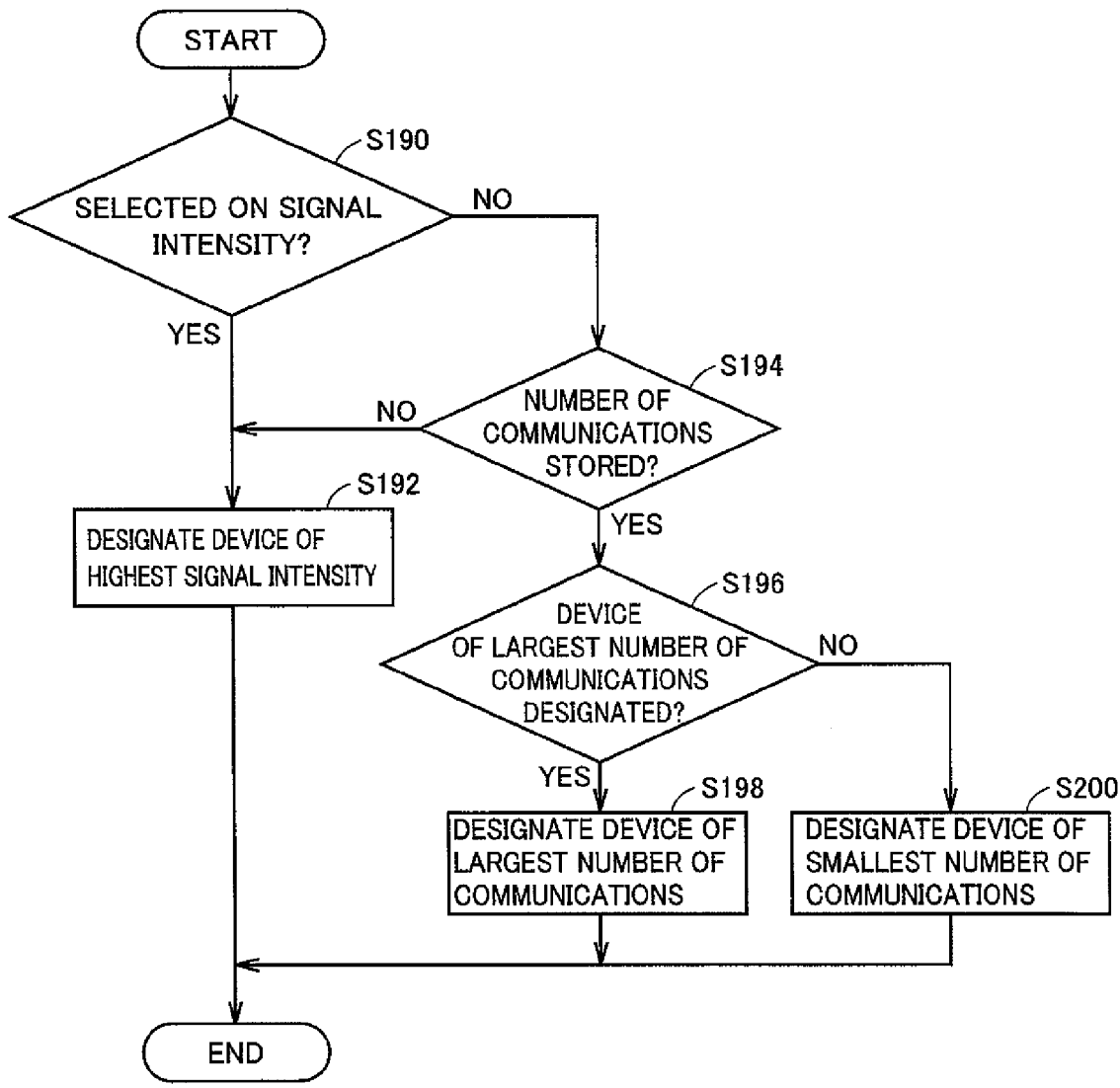
FIG. 7 is a flowchart representing a content reproducing device selecting process in accordance with the embodiment of the present invention.

At step S164, connection establishment detecting unit 130 selects a content reproducing device 20 to perform exchange of content data. This process is shown in FIG. 7.

At step S166, connection establishment detecting unit 130 transmits information indicating a request for starting communication and information representing terminal type of itself, to the content reproducing device 20 selected by itself at step S164. Specific content of "information representing type" is not specifically limited. By way of example, it may indicate whether the terminal is a portable telephone or not, or it may represent a type classified based on compatible communication protocols.

At step S168, connection establishment detecting unit 130 determines whether the short range communication unit 42 has received ACK (signal acknowledging reception of information) from the counterpart content reproducing device 20 (the content reproducing device 20 that transmitted the request for starting communication and the like at step S166). If the connection establishment detection unit 130 determines that short range communication unit 42 has received ACK (YES at step S168), the process proceeds to step S170. If not (NO at step S168), the process proceeds to step S160.

At step S170, connection establishment detecting unit 130 generates a signal indicating establishment of connection, and stores it in a buffer provided in itself. In addition, connection history storage unit 128 stores information identifying the content reproducing device 20 that has transmitted ACK, in memory 56.

Figure 6:
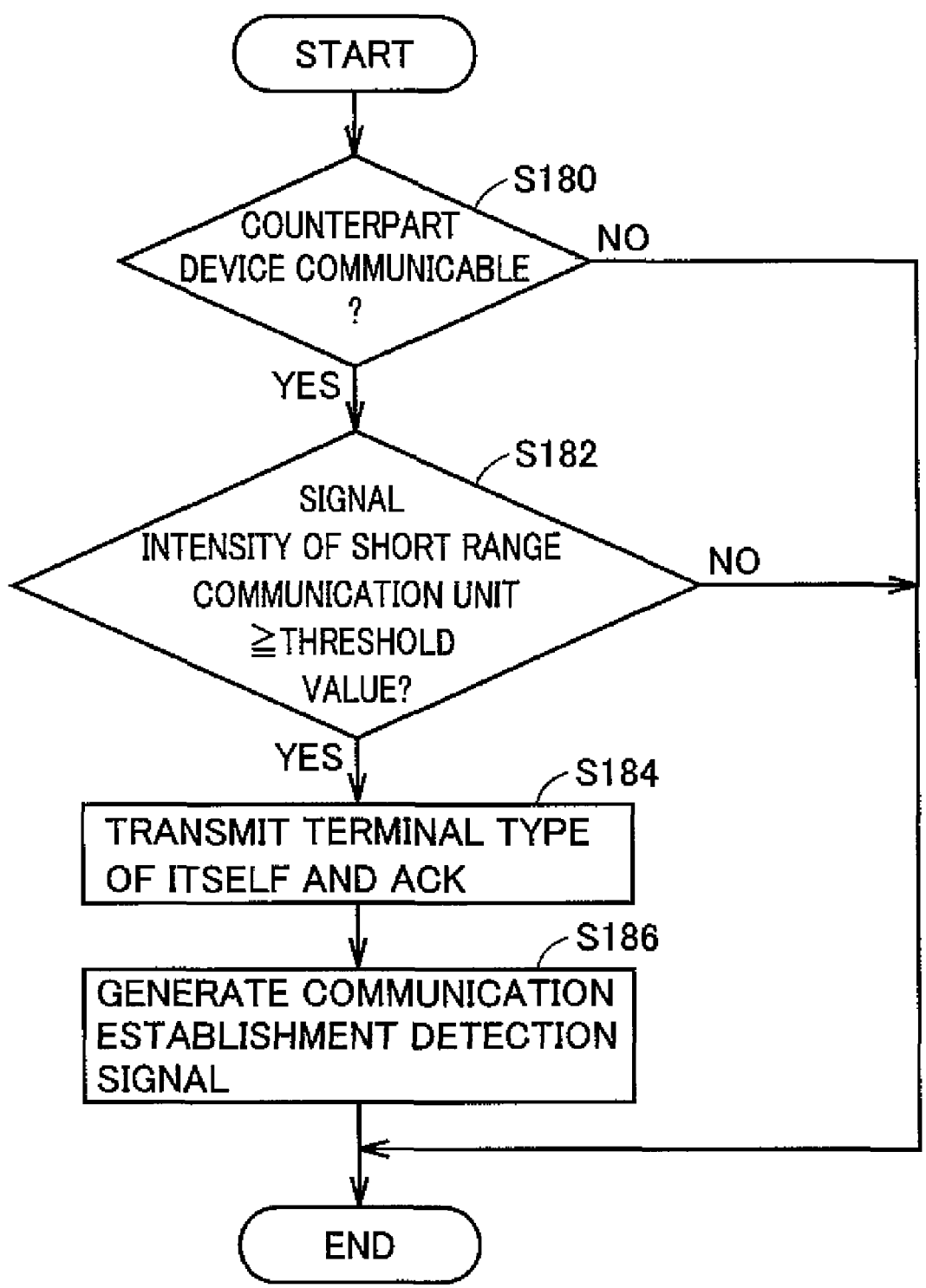
FIG. 6 is a flowchart representing an establishing process when there is a request for starting communication, in accordance with the embodiment of the present invention.

Referring to FIG. 6, the program executed by content reproducing device 20 executes the following control, in relation to the establishment of communication when there is a request for starting communication.

At step S180, when radio wave is received by the antenna, short range demodulation unit 82 demodulates an electric signal output by the antenna based on the received radio wave. Short range demodulation unit 82 outputs the demodulated electric signal to control unit 58. Based on the electric signal output from short range demodulation unit 82, connection establishment detecting unit 130 determines whether the transmission source of the signal is an apparatus capable of information communication with itself. If connection establishment detecting unit 130 determines that the transmission source is an apparatus capable of communicating information with itself (YES at step S180), the process proceeds to step S182. If not (NO at step S180), the process ends. The factor considered for determining whether the communication of information is possible or not is not specifically limited. It is noted, however, that in the present embodiment, connection establishment detecting unit 130 determines that communication with the apparatus as the transmission source is possible if the information indicated by the radio wave includes a prescribed code.

At step S182, signal measuring unit 84 measures the intensity of electric signal output from short range demodulation unit 82, and outputs information indicative of the intensity to control unit 58. Based on the information output from signal measuring unit 84, connection establishment detecting unit 130 determines whether the intensity of the signal output from short range demodulation unit 82 is equal to or higher than the threshold value. If connection establishment detecting unit 130 determines that the signal intensity is equal to or higher than the threshold value (YES at step S182), the process proceeds to step S184. If not (NO at step S182), the process ends.

At step S184, connection establishment detecting unit 130 outputs information indicating the terminal type of itself and information as ACK to short range modulation unit 80. Receiving the pieces of information in the form of a signal, short range modulation unit 80 modulates the signal and outputs the modulated signal to the antenna. The antenna transmits the signal as radio wave.

At step S186, connection establishment detecting unit 130 generates a signal indicating that communication has been established, and stores it in the buffer of itself. In addition, connection history storage unit 128 stores information indicating a terminal that has transmitted the signal at step S180 in memory 56.

Referring to FIG. 7, the program executed by content reproducing device 20 executes the following control in relation to the selection of the apparatus as a counterpart of exchanging content data.

At step S190, connection establishment detecting unit 130 determines whether an apparatus with which content data is to be exchanged should be selected based on signal intensity or not. The determination is made based on the value stored in the buffer provided in control unit 58. If connection establishment detecting unit 130 determines that the apparatus is to be selected based on the signal intensity (YES at step S190), the process proceeds to step S192. If not (NO at step S190), connection establishment detecting unit 130 passes the process to step S194.

At step S192, connection establishment detecting unit 130 selects an apparatus that has the highest signal intensity, based on the information indicative of signal intensity output from signal measuring unit 84. When the apparatus is selected, connection establishment detecting unit 130 stores information representing the apparatus in the buffer provided in itself.

At step S194, connection establishment detecting unit 130 determines whether information representing number of communications is stored in memory 56 or not. If connection establishment detecting unit 130 determines that the information representing the number of communications is stored in memory 56 (YES at step S194), the process proceeds to step S196. If not (NO at step S194), connection establishment detecting unit 130 passes the process to step S192.

At step S196, connection establishment detecting unit 130 determines, based on the information stored in its buffer, whether the apparatus of which number of communications is large is to be designated as the counterpart of exchanging content data or not. If connection establishment detecting unit 130 determines that the apparatus of large number of communications is to be designated (YES at step S196), the process proceeds to step S198. If not (NO at step S196), connection establishment detecting unit 130 passes the process to step S200.

At step S198, connection establishment detecting unit 130 reads information representing the number of communications from memory 56. Based on the read information, connection establishment detecting unit 130 selects the apparatus of which number of communications is the largest. Selecting the apparatus, connection establishment detecting unit 130 stores the information representing the apparatus of which number of communications is the largest in the buffer provided in itself.

At step S200, connection establishment detecting unit 130 reads information representing the number of communications from memory 56. Based on the read information, connection establishment detecting unit 130 selects an apparatus of which number of communications is the smallest. Selecting the apparatus, connection establishment detecting unit 130 stores information representing the apparatus of which number of communications is the smallest in the buffer provided in itself.

Figure 8:
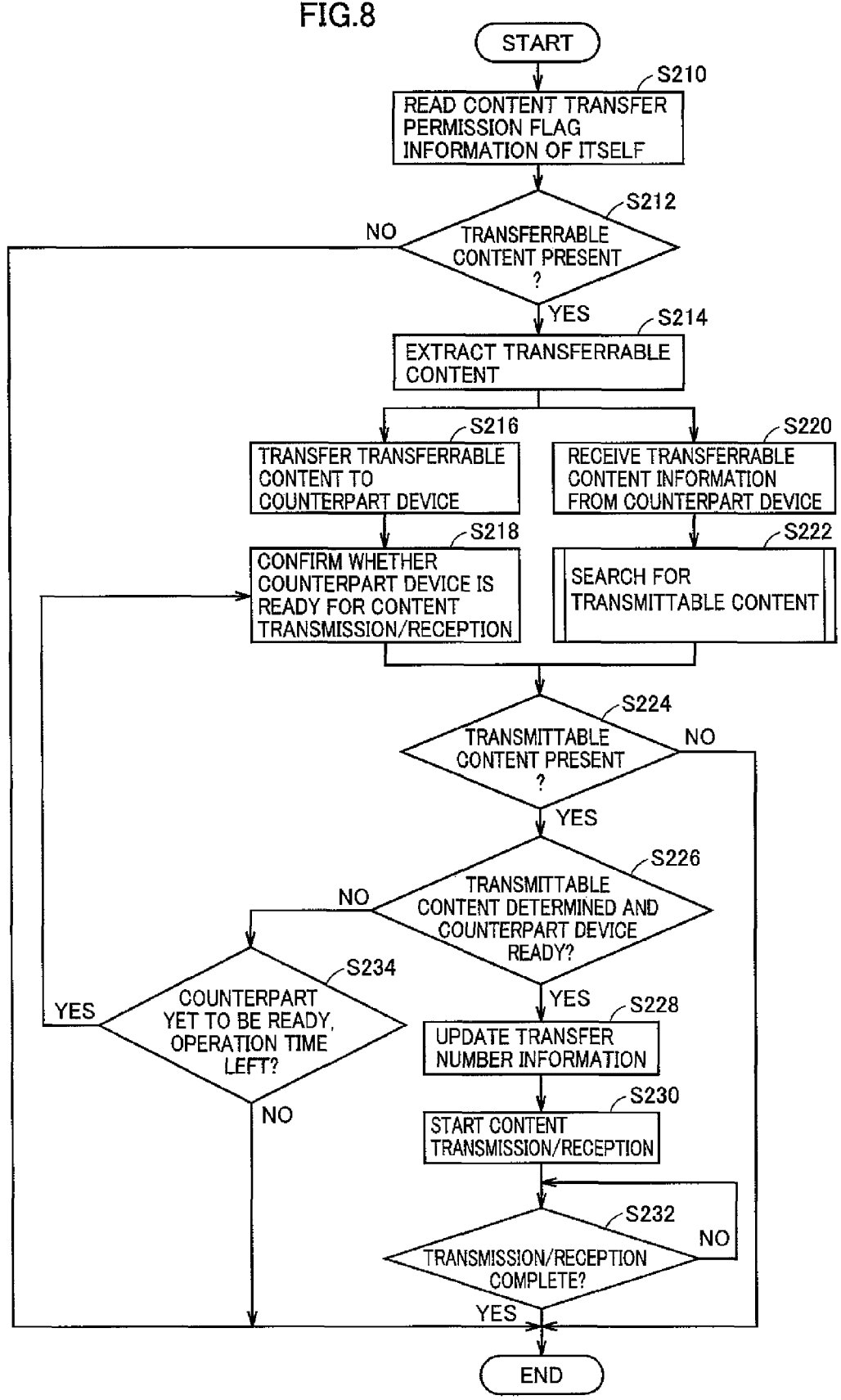
FIG. 8 is a flowchart representing a content data communication process in accordance with the embodiment of the present invention.

Referring to FIG. 8, the program executed in content data reproducing device 20 executes the following control in relation to content data communication.

At step S210, content selecting unit 110 reads flag information from memory 56.

At step S212, content selecting unit 110 determines whether there is a transferrable content, based on a value of a flag representing transfer permission, among the pieces of flag information. If content selecting unit 110 determines that there is a content of which transfer is permitted (YES at step S212), content selecting unit 110 passes the process to step S214. Otherwise (NO at step S212), the process ends.

At step S214, content selecting unit 110 copies information of which flag value of transfer permission is "1" (indicating that transfer is permitted) to the buffer provided in itself. This means that the transferrable content is extracted.

At step S216, connection establishment detecting unit 130 outputs information indicating the title provided in the buffer, that is, information representing the transferrable content, to short range modulation unit 80. Short range modulation unit 80 modulates the signal indicating the information and outputs it to the antenna. Based on the signal, the antenna emits radio wave. At step S218, connection establishment detecting unit 130 outputs inquiry information asking whether content data communication is ready or not, to short range modulation unit 80. Short range modulation unit 80 modulates the signal representing the information, and outputs the modulated signal to the antenna. The antenna emits the signal as a radio wave.

At step S220, the antenna of short range communication unit 42 receives information representing the transferrable content, from the counterpart apparatus. The information is transmitted to short range demodulation unit 82. Short range demodulation unit 82 demodulates the signal, and outputs the demodulated signal to control unit 58.

At step S222, content searching unit 112 searches for a transmittable content, based on the information represented by the signal demodulated by short range demodulation unit 82. FIG. 9 shows details of this process.

At step S224, content searching unit 112 determines whether there is any content that can be transmitted to the counterpart apparatus. If content searching unit 112 determines that there is such content (YES at step S224), content searching unit passes the process to step S226. Otherwise (NO at step S224), the process ends.

At step S226, connection establishment detecting unit 130 determines whether a transmittable content has been determined and whether the counterpart is ready or not. If connection establishment detecting unit 130 determines that a transmittable content has been determined and the counterpart is ready (YES at step S226), the process proceeds to step S228. If not (NO at step S226), connection establishment detecting unit 130 passes the process to step 234.

At step S228, number control unit 124 updates the contents of memory 56 such that information representing number of transfers is decremented by "1", among the pieces of flag information of the content determined to be the transmittable content.

At step S230, connection establishment detecting unit 130 starts the process for transmitting/receiving the content data. Thereafter, the content data is transmitted/received.

At step S232, connection establishment detecting unit 130 determines whether transmission/reception of content data has been completed or not, based on information output from short range communication unit 42 and the like. If connection establishment detecting unit 130 determines that transmission/reception of content data has been completed (YES at step S232), the process ends. If not (NO at step S232), connection establishment detecting unit 130 passes the process to step S232.

At step S234, connection establishment detecting unit 130 determines whether the counterpart apparatus is yet to be ready for transmitting/receiving content data and operation time remains. If connection establishment detecting unit 130 determines that the counterpart apparatus is yet to be ready and operation time remains (YES at step S234), the process proceeds to step S218. Otherwise (NO at step S234), connection establishment detecting unit 130 terminates the process.

Referring to FIG. 9, the program executed by content reproducing device 20 executes the following control in relation to the search for transmittable content.

At step S240, content searching unit 112 determines whether data related to the content owned by the counterpart is to be searched with priority, based on the value stored in the buffer provided in itself. If content searching unit 112 determines that data related to the content owned by the counterpart is to be searched with priority (YES at step S240), the process proceeds to step S242. If not (NO at step S240), content searching unit 112 passes the process to step S254.

At step S242, content searching unit 112 reads, from the pieces of flag information stored in the buffer of itself, a piece of information representing the title, a piece of information representing a keyword and a piece of information representing transmission source, of one content. In the present embodiment, these pieces of information are read as data Slist (i, n). Of the suffixes of data Slist (i, n), "i" corresponds to the content, and "n" corresponds to the type of information. Therefore, data having different values of suffix "i" represent pieces of information of different contents. Data having different value of suffix "n" represent pieces of different type information of one content.

At step S244, content searching unit 112 reads the piece of information representing title name and the piece of information representing keyword, among the pieces of information representing the content of the counterpart stored in the buffer of itself. In the present embodiment, these pieces of information are read as data Dlist (j, m). Of the suffixes of data Dlist (j, m), "j" corresponds to the content, and "m" corresponds to the type of information. Therefore, data having different values of suffix "j" represent pieces of information of different contents. Data having different value of suffix "m" represent pieces of different type information of one content.

At step S246, content searching unit 112 determines, based on the piece of information representing the transmission source read at step S242, whether the information represents a content that has been transmitted in the past from the counterpart. If content searching unit 112 determines that the information represents the content transmitted in the past from the counterpart (YES at step S246), the process proceeds to step S248. If not (NO at step S246), content searching unit 112 passes the process to step S250.

At step S248, content searching unit 112 determines, based on the information stored in the buffer, whether the search for data Dlist (j, m) has been completed or not. If content searching unit 112 determines that searching of data Dlist (j, m) has been completed (YES at step S248), the process proceeds to step S264. If not (NO at step S248), content searching unit 112 passes the process to step S244.

At step S250, content searching unit 112 determines whether the content as the candidate to be transmitted relates to the content owned by the counterpart. The factor for determining whether it is related or not is not specifically limited. In the present embodiment, by way of example, the transmission candidate content is considered to be related to the content owned by the counterpart in the following two cases. The first case is that the keyword read as data Slist (i, n) matches with the keyword read as data Dlist (j, m). The second case is that the ratio of matching portions in the character sequence forming the title is above a threshold value. The character sequence forming the title is represented by data Slist (i, n) and data Dlist (j, m). If content searching unit 112 determines that it relates to the content of the counterpart (YES at step S250), the process proceeds to step S252. If not (NO at step S250), content searching unit 112 passes the process to step S248.

At step S252, content searching unit 112 determines the content that has been the object of comparison at step S250 to be the object of transmission. For this purpose, content searching unit 112 stores the piece of information representing the title name of the content in the buffer. This indicates that there is a content as the object of transmission.

At step S254, content searching unit 112 reads content information as the object of transfer stored in the buffer. In the present embodiment, these pieces of information are read as data Slist (i, n).

At step S256, content searching unit 112 reads the pieces of information stored in the buffer as the content of the counterpart. In the present embodiment, these pieces of information are read as data Dlist (j, m).

At step S258, content searching unit 112 compares the information representing the content read at step S254 with the information representing the content read at step S256, and determines whether these pieces of information are related or not. Though the factor for determining whether these are related or not is not specifically limited, in the present embodiment, determination is made based on the same factor as that at step S250. If content searching unit 112 determines that these pieces of information are related (YES at step S258), the process proceed to step S260. If not NO at step S258), content searching unit 112 passes the process to step S262.

At step S260, content searching unit 112 determines whether searching of data Slist (i, n) is finished or not, based on the information stored in the buffer. If content searching unit 112 determines that searching of data Slist (i, n) is finished (YES at step S260), the process ends. If not (NO at step S260), content searching unit 112 passes the process to step S254.

At step S262, content searching unit 112 determines whether searching of data Dlist (j, m) is finished or not, based on the information stored in the buffer. If content searching unit 112 determines that searching of data Dlist (j, m) is finished (YES at steps S262), the process proceeds to step S252. If not (NO at step S262), content searching unit 112 passes the process to step S256.

At step S264, content searching unit 112 determines whether searching of data Slist (i, n) is finished or not, based on the information stored in the buffer. If content searching unit 112 determines that searching of data Slist (i, n) is finished (YES at step S246), the process ends. If not (NO at step S264), content searching unit 112 passes the process to step S242.

The operation of contents exchange system based on the structure and flowchart as above will be described in the following.

In content reproducing device 20a, connection establishment detecting unit 130 determines whether the signal intensity received by short range communication unit 42 is equal to or higher than the threshold value (step S160). If the signal intensity is determined to be equal to or higher than the threshold value (YES at step S160), connection establishment detecting unit 130 determines whether there is two or more content reproducing devices (step S162). Here, if it is determined that there is one content reproducing device (NO at step S162), connection establishment detecting unit 130 controls short range communication unit 42 such that a communication request and terminal type of itself are transmitted (step S166).

In content reproducing device 20b, short range communication unit 42 receives the requests for starting communication and the terminal type transmitted by content reproducing device 20a. Receiving these, connection establishment detecting unit 130 determines whether content reproducing device 20a is a communicable device or not (step S180). Because content reproducing device 20a is a communicable device (YES at step S180), connection establishment detecting device 130 determines whether the intensity of signal transmitted from content reproducing device 20a is equal to or higher than the threshold value (step S182). If connection establishment detecting device 130 determines that the signal intensity is equal to or higher than the threshold value (YES at step S182), connection establishment detecting unit 130 causes short range communication unit 42 to transmit the terminal type of itself and ACK (step S184). Thereafter, connection history storage unit 128 generates a signal indicating establishment of connection, and has the signal stored in the buffer (step S186).

Short range communication unit 42 of content reproducing device 20a receives the terminal type and ACK. Receiving these, connection establishment detecting unit 130 determines whether ACK has been received from content reproducing device 20b (step S168). As short range communication unit 42 has received ACK and the like (YES at step S168), connection establishment detecting unit 130 generates a signal indicating establishment of connection, and has the signal stored in the buffer (step S170).

Thereafter, content selecting unit 110 of content reproducing device 20a reads flag information from memory 56 (step S210). When flag information is read, content selecting unit 110 determines whether there is any transferrable content (step S212). FIG. 10 shows some pieces of flag information stored in memory 56 of content reproducing device 20 at this time point. As is apparent from FIG. 10, there is a transferrable content (content having the flag value of "1" indicating transfer permission) (YES at step S212), content selecting unit 110 copies flag information of the transferrable content to the buffer (step S214). After the flag content is copied, connection establishment detecting unit 130 causes short range communication unit 47 to transmit information representing the transferrable content. The transmission destination is content reproducing device 20b (step S216). After transmission, connection establishment detecting unit 130 confirms whether content reproducing device 20b is ready for content data communication or not (step S218).

In parallel with the process of steps S216 and S218, short range communication unit 42 receives information representing the transferrable content, from content reproducing device 20b (step S220). Receiving the information, content searching unit 112 determines whether data related to the content owned by the counterpart is to be searched with priority or not (step S240). If content searching unit 112 determines that data related to the content owned by the counterpart is to be searched with priority (YES at step S240), content searching unit 112 reads data Slist (i, n) of content stored by itself, among the pieces of information stored in the buffer (step S242). When the data is read, content searching unit 112 reads data Dlist (j, m) representing the content stored by the counterpart from the buffer (step S244). When the data is read, content searching unit 112 determines whether the content stored by itself is the one transmitted in the past from the counterpart (content reproducing device 20b) or not (step S246). If not (NO at step S246), content searching unit 112 determines whether the content read at step S242 and the content read at step S244 are related (step S250). If content searching unit 112 determines that the contents are related (YES at step S250), content searching unit 112 determines the content of which flag information has been read at step S242 to be the transfer data (step S252).

After the transfer data is selected, content searching unit 112 determines whether there is any transferrable content (step S224). Since there is a transferrable content (YES at step S224), connection establishment detecting unit 130 determines whether the transmittable content has been determined and the counterpart (content reproducing device 20b) is ready or not (step S226). If connection establishment detecting unit 130 determines that transmittable content has been determined and the counterpart is ready (YES at step S226), number control unit 124 updates the piece of information representing the number of transfers in the flag information of content data to be transmitted to content reproducing device 20b (step S228). After updating of the information, connection establishment detecting unit 130 causes short range communication unit 48 to transmit the content data (step S230). If transmission/reception is completed (YES at step S232), transmission/reception of content data is finished.

FIG. 11 shows some of the pieces of flag information stored in memory 56 of content reproducing device 20b, before completion of transmission/reception. FIG. 12 shows some of the pieces of flag information stored in memory 56 of content reproducing device 20a after completion of content data transmission/reception. FIG. 13 shows part of content data stored in memory 56 of content reproducing device 20b after completion of content data transmission/reception. As the content data is transmitted/received, stored contents are changed, and the piece of information representing the number of transfers is changed.

As described above, if content reproducing devices 20 are close to each other and storing content data as objects of exchange between each other, the contents exchange system in accordance with the embodiment of the present invention exchanges the content data. Consequently, one content data come to be exchanged with another. As the content data are exchanged, the user of content reproducing device 20 can enjoy various and many contents (including contents not known to the user). To enjoy the contents, it is necessary for the user to store content as the object of exchange in content reproducing device 20 beforehand and, therefore, the user is encouraged to obtain various and many contents data. Various and many contents data are input and the contents would be enjoyed. Therefore, a contents exchange system that can expand the opportunities of using video and music can be provided.

Further, it becomes possible to distribute contents quickly and over a wide range without necessitating any intentional operation by the user. Thus, it becomes possible to widely distribute promotional content and the like.

As a first modification of the present embodiment, content reproducing device 20 may include, in place of base station communication unit 40 and short range communication unit 42, a device for communicating information through wired communication. Alternatively, content reproducing device 20 may include, in place of one of the base station communication unit 40 and short range communication unit 42, a device for communicating information through wired communication. In such cases, content reproducing device 20 may include a plurality of communication devices communicating in accordance with different protocols. If content reproducing device 20 includes a plurality of communication devices, these communication devices may be selectively used in accordance with the information to be transmitted.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A communication terminal forming a contents exchange system, comprising:
   a communication device;
   an operation unit receiving an input of an instruction to said communication terminal;
   a memory; and
   a controller for controlling an operation of said communication terminal;
      said communication device communicates, to/from another communication terminal, request information requiring a response, response information representing the response, content data representing content as at least one of image and voice, and determination information defining whether said content data is to be an object of transmission;
   said memory stores said content data and said determination information;
   said controller causes another communication terminal included in said contents exchange system to repeatedly transmit said request information to said communication device,
   when the response information transmitted from said another communication terminal in response to said request information is received by said communication device, causes said communication terminal that transmitted said response information to transmit said determination information to said communication device,
   when said request information is received from said another communication terminal, causes said communication device to transmit said response information and said determination information to said another communication terminal,
   when transmitted determination information is different from received determination information, the controller determines whether said content data is to be transmitted, based on the transmitted and received determination information,
   causes said communication device to transmit the content data determined to be transmitted, and
   when content data different from the transmitted content data is received by said communication device, stores in said memory said received content data and the determination information on said received content data;
   said communication terminal further comprising
      an output device for outputting said content.

2. The communication terminal according to claim 1, wherein
   said memory stores a plurality of said content data and pieces of determination information corresponding to said plurality of content data respectively; and
   said controller determines whether each of said plurality of content data is to be transmitted.

3. The communication terminal according to claim 1, wherein
   after content data stored in said memory is transmitted by said communication device, said controller erases the content data stored in said memory.

4. The communication terminal according to claim 3, wherein
   said determination information includes necessary/unnecessary information representing whether erasure of content data stored in said memory is necessary or not; and when said necessary/unnecessary information indicates erasure of said content data is necessary, said controller erases the content data stored in said memory.

5. The communication terminal according to claim 1, wherein
said communication device receives content data and determination information on said content data from a content data transmitting device, and transmits to said another communication terminal said received content data and said determination information on said content data; and
said controller stores in said memory the content data received from said content data transmitting device and the determination information on the content data received from said content data transmitting device.

6. The communication terminal according to claim 5, wherein
said controller stores, when determination information permitting transmission is received from said content data transmitting device, the determination information received from said content data transmitting device in said memory, and
when said determination information permitting transmission is not received from said content data transmitting device, stores determination information not permitting said transmission as determination information on the content data received from said content data transmitting device, in said memory.

7. The communication terminal according to claim 1, wherein
said communication device receives said content data and the determination information on said content data from the content data transmitting device through wireless communication, and transmits received said content data and said determination information to said another communication terminal through wireless communication; and
said controller stores said content data and said determination information received by said communication device in said memory.

8. The communication terminal according to claim 1, wherein
said response information includes terminal identification information predetermined differently for each communication terminal;
said memory further stores information representing number of transmissions corresponding to said terminal identification information; and
said controller causes a communication terminal of which number of transmissions is the largest among communication terminals to which said response information is transmitted, to transmit said determination information to said communication device, based on said information representing the number of transmissions.

9. The communication terminal according to claim 8, wherein
said communication device communicates said request information, said response information, said content data and said determination information through radio wave; and
said controller causes, when there is one communication terminal of which number of transmissions is the largest, said communication terminal of the largest transmission number to transmit said determination information to said communication device, and
when there are two or more communication terminals of which number of transmissions is the largest, causes the communication terminal that transmitted response information with radio wave of highest intensity among the communication terminals of largest transmission numbers, to transmit said determination information to said communication device.

10. The communication terminal according to claim 1, wherein
said communication device communicates said request information, said response information, said content data and said determination information through radio wave; and
said controller causes the communication terminal that transmitted response information with radio wave of highest intensity among the communication terminals transmitted said response information, to transmit said determination information to said communication device.

11. The communication terminal according to claim 1, wherein
said memory further stores communication permission information indicating whether communication is permitted or not;
said communication permission information corresponds to any of said communication terminals; and
said controller causes the communication terminal corresponding to the communication permission information permitting communication, to transmit said determination information to said communication device.

12. The communication terminal according to claim 11, wherein
said operation unit receives an instruction to update said communication permission information; and
said controller updates the communication permission information stored in said memory, in response to reception of said instruction.

13. The communication terminal according to claim 1, wherein
when said communication device receives content data different from said transmitted content data, said controller causes the content to be output to said output device, based on the content data received by said communication device.

14. The communication terminal according to claim 1, wherein
said determination information includes information indicating name of said content:
said output device includes a display device;
said memory stores said determination information in correspondence with the order of reception of said content data; and
said controller has the names of said contents displayed on said display device in the order of reception of said content data.

15. A method of exchanging contents, comprising the steps of:
repeatedly transmitting request information requiring response;
receiving response information representing said response, transmitted in response to said request information;
transmitting determination information for determining whether content data representing a content that is at least one of image and voice is to be an object of transmission or not, to the transmitter of said response information;
transmitting said response information and said determination information to the transmitter of said request information;

when said determination information is transmitted and determination information different from said transmitted determination information is received, determining whether said content data is to be transmitted, based on said transmitted determination information and said received determination information;

transmitting the content data determined to be transmitted;

when content data different from said transmitted content data is received, storing said received content data and determination information on said received content data; and outputting content based on the stored content data.

* * * * *